United States Patent [19]

Hancock

[11] Patent Number: 4,532,278

[45] Date of Patent: Jul. 30, 1985

[54] FIRE RETARDANT POLYOLEFIN FIBERS AND FABRICS

[76] Inventor: Henry Hancock, 9 Decker Ter., Kinnelon, N.J. 07403

[21] Appl. No.: 373,346

[22] Filed: Apr. 30, 1982

Related U.S. Application Data

[63] Continuation-in-part of Ser. No. 551,517, Nov. 16, 1983, abandoned, which is a continuation of Ser. No. 201,338, Oct. 27, 1980, abandoned.

[51] Int. Cl.³ .............................. C08K 5/03; C08K 5/34
[52] U.S. Cl. ..................................... 524/101; 524/339; 524/343; 524/371; 524/469
[58] Field of Search ................ 524/464, 465, 467, 196, 524/197, 210, 222, 223, 469, 101, 81, 339, 343, 371

[56] References Cited

U.S. PATENT DOCUMENTS

| | | | |
|---|---|---|---|
| 3,331,797 | 7/1967 | Kopetz et al. | 524/469 |
| 4,049,654 | 9/1977 | Spivack | 524/101 |
| 4,203,882 | 5/1980 | Bertelli et al. | 524/101 |

OTHER PUBLICATIONS

Tabor, T. and Bergman, S., "Decabromodiphenyl Oxide-A New Fire Retardant Additive for Plastics", Fire Retardants: Proceedings of 1974 International Symposium on Flammability and Fire Retardants, May 1-2, 1974.

Primary Examiner—John Kight
Assistant Examiner—Kriellion Morgan
Attorney, Agent, or Firm—Stephen E. Feldman; Nikolay Parada

[57] ABSTRACT

Fibers and fabrics formed from polypropylene as well as other polyolefins and high polymers, are rendered flame retardant by the addition of a bromophenyl compound having the following formula:

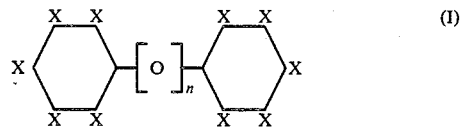

wherein n is 0 or 1; X is bromine, hydrogen, hydroxyl, or alkyl; and wherein the alkyl portion of these groups may contain hydroxyl and/or oxygen; and wherein the alkyl is preferably a lower alkyl ($C_1$-$C_4$); and wherein there is at least one bromine for each phenyl radical; and a tris (hydroxybenzyl) isocyanurate, particularly tris (3,5-di-t-butyl-4-hydroxybenzyl) isocyanurate. The composition of formula (I) and the isocyanurate are blended into the polymer in the forming operations and the polymer blend is thermally extruded to form a fiber which fiber exhibits exceptionally high flame retardancy, as well as a good white appearance upon extrusion so as to be readily dyed without grey overtones.

11 Claims, No Drawings

FIRE RETARDANT POLYOLEFIN FIBERS AND FABRICS

RELATED U.S. APPLICATION DATA

This application is a continuation-in-part of the Ser. No. 551,517, filed November 16, 1983 which is a continuation of the Ser. No. 201,338, filed October 27, 1980 now abandoned.

FIELD OF THE INVENTION

This invention relates to a fire retardant polyolefins. Specifically this invention relates to providing a fire retardant polypropylene. More specifically this invention relates to providing polypropylene extruded fibers which are highly flame retardant; and yet have a water-white appearance.

BACKGROUND AND DISCUSSION OF PRIOR ART

Flame retardancy has become a major consideration for many plastic articles used in industrial, commercial and household products. The polyolefins have been, and are being further considered in these areas specifically in the textile area where extruded filaments or fibers of these polymers with their many desirable chemical and physical properties offer much in specific end uses. However, the art has not been able to develop a satisfactory fire retardant additive, or additives, for extruded polyolefin fibers. In selecting such additives, care must be taken that the additive does not alter the properties of the resin, e.g., color, flexibility, tensile strength, electrical properties, softening point, etc. However, to date, the art has been unable to develop a suitable system which will impart fire retardancy to polyolefins without unsatisfactorily affecting some of the desirable properties of the resin. The problem of color quality is particularly acute in regards to fibers and fabrics, in that any material added to the resin blend must not impart a discoloration or grey appearance. If discolored or grey in appearance any light color dye would take on grey overtones.

In another aspect, the synthetic textile industry was desirous of obtaining a fire retardant polyolefin fiber or fabric, wherein the presence of the fire retardant in the fiber or fabric would in one respect be effective as a flame retardant while in another respect would not alter the desirable properties of the fabric, particularly, color, and hand. This is particularly important in fabrics for household and personal use, such as in clothing and furniture coverings.

The prior art sought to incorporate certain phosphates into the thermoplastic melt in an attempt to provide an inherent flame retardant polypropylene. In Listner, U.S. Pat. No. 3,650,300, granted Mar. 21, 1972, polyolefins were rendered flame retardant by the incorporation of an antioxidant, a halogen phosphate, a free radical initiator and a dispersant into the thermoplastic melt. In Murray et al, U.S. Pat. No. 3,063,502, granted May 16, 1972, phosphine oxides and ammonium polyphosphates were incorporated into the polypropylene melt or mix. In Versnel, U.S. Pat. No. 3,893,970, granted July 8, 1975, a phosphite adjuvant is incorporated into molten polypropylene. In Wolf I, U.S. Pat. No. 3,894,876, granted July 15, 1975, and Wolf II, U.S. Pat. No. 3,894,121, granted July 8, 1975, phosphonitrilic esters are considered for flame proofing synthetic materials. In Nachbur et al, U.S. Pat. No. 3,800,010, granted Mar. 26, 1974, phosphonopropionic acid amines are proposed as flame proofing agents for fibers or in plastics.

In Goldborn et al I, U.S. Pat. No. 3,803,269, granted Apr. 9, 1974, Goldborn et al II, U.S. Pat. No. 3,870,771, granted Mar. 11, 1975, Goldborn et al III, U.S. Pat. No. 3,935,162, and Goldborn et al IV, U.S. Pat. No. 3,976,620, various alkyl-aryl phosphonates were proposed for incorporation into polyolefin thermoplastic melts to provide flame retardancy.

In Anderson et al I, U.S. Pat. No. 3,849,368, granted Nov. 19, 1974, and Anderson et al II, U.S. Pat. No. 3,789,091, granted Jan. 29, 1974, certain cyclic phosphonate esters were proposed to be incorporated into polyesters to provide flame retardancy. Polyolefins and polypropylene substrates are not mentioned.

Certain prior art references were directed to rendering textile flame retardant by the use of phosphonateisocyanurate as disclosed in Marinus et al, U.S. Pat. No. 4,085,283, granted Apr. 18, 1978.

Certain other prior art references were directed to flame proofing specific polymers with a bromine compound. In Eichhorn, U.S. Pat. No. 3,058,926, there is disclosed a method for making flame proof alkenyl aromatic resin composition by incorporating an organic bromine compound and an organic peroxide.

In Orlando et al, U.S. Pat. No. 3,989,531, granted Nov. 2, 1976, there is disclosed the use of a broad range of bromobiphenols for use as fire-retardants in numerous polymeric compositions. Franz et al, U.S. Pat. No. 3,922,459 granted Nov. 25, 1975 discloses the use of pentabromodiphenyl esters in laminate structures. In Betts, U.S. Pat. No. 4,123,586, granted Oct. 31, 1978 and U.S. Pat. No. 4,022,945, granted May 10, 1977 there is disclosed the use of a broad range of halogenated hydrocarbons, including a shotgun disclosure, decabromodiphenyl oxide in combination with other specific additives such as metal oxides, silicone gum and dibasic lead phthalates for an electrical conductor, flame-resistant insulation.

It was also known in the prior art to include certain amounts of tris(3,5-di-t-butyl-4-hydroxybenzyl)isocyanurate as a UV stabilizer for polyolefins, particularly polypropylene.

While the prior art mentions the use of decabromophenyl oxide in combination with other components to coat certain plastics for fire retardancy, the prior art failed to recognize that a certain combination of components including, namely, decabromophenyl oxide with a tris(hydroxybenzyl)isocyanurate can be blended within the structure of polyolefins, principally polypropylene, for extrusion to fibers, wherein the fibers exhibit excellent flame retardancy as well as providing good aesthetic qualities, particularly whiteness.

It was thus surprising to find that the combination of decabromophenyl oxide and tris(3,5-di-t-butyl-4-hydroxybenzyl)isocyanurate when blended in polypropylene and extruded as a fiber, produced a more highly flame retardant fiber than absent the said combination, and yet maintained a water-white appearance.

Now there is provided by the present invention a combination of compositions and a method for rendering polyolefin materials flame retardant without loss of the desirable textile properties such as water-white color and hand.

It is therefore an object of this invention to provide a highly flame retardant polyolefin material which exhibits desirable textile fiber and fabric properties.

It is another object of this invention to provide flame retardant composition and method for polyolefins which is useful for human contact applications.

It is still another object of this invention to provide a composition for making a flame retardant polyolefin and which can readily be extruded to form fibers in fiber extrusion, without imparting undesirable discoloration to the fiber. extrusion, without imparting undesirable discoloration to the fiber.

It is still a further object of this invention to provide a flame retardant polyolefin which retains its properties of flame retardancy and textile properties upon exposure to the ambient environment.

It is still a further object of this invention to provide a polyolefin wall covering which meets the stringent requirements of regulatory flame retardancy tests.

It is still another object of this invention to provide flame retardant polyolefin fabrics which are commercially useful in a broad range of applications, and yet safe and practical in operation.

DESCRIPTION OF THE PREFERRED EMBODIMENTS

Broadly speaking, the present invention comprises a polyolefin comprising a flame retardant composition in turn comprising:

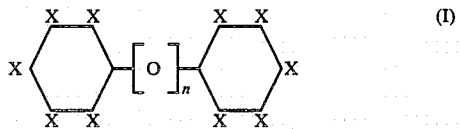

wherein n is 0 or 1; X is bromine, hydrogen, hydroxyl, or alkyl; and wherein the alkyl portion of these groups may contain hydroxyl and/or oxygen; and wherein the alkyl is preferably a lower alkyl ($C_1$–$C_4$), and wherein there is at least one bromine for each phenyl radical; and a tris(hydroxybenzyl)isocyanurate.

Suitable isocyanurates pursuant to the present invention include the aryl isocyanurates including more particularly tris benzyl isocyanurate and the hydroxy substituted form thereof. In addition, alkyl addition of the tris(hydroxybenzyl)isocyanurate, particularly wherein the alkyl is the lower alkyl $C_1$ to $C_6$. Most preferred is tris(3,5-di-t-butyl-4-hydroxybenzyl)isocyanurate.

Preferably each phenyl radical of one composition of formula (I) will contain at least 2 or more Br, and preferably 4 or more Br/phenyl.

The composition of formula (I) is blended into the polymer in conventional forming operations specifically prior to or during extrusion.

The compound of formula (I) may readily be introduced during forming operations to provide excellent flame retardant properties to the polyolefin.

In a preferred aspect the present invention comprises an extruded polyolefin fiber which comprises the flame retardant of the aforesaid formula (I). The flame retardant is present in an amount of from about 3% to about 15% by weight of the polyolefin and is blended into the polyolefin before or during thermal extrusion.

It has surprisingly been found that the high temperature extrusion particularly with polypropylene there is no discoloration to the fiber imparted to the fiber. Often in the prior art the high temperature and additives to the polypropylene would impart undesirable "greyness" which is surprisingly avoided in the present invention.

In the preferred aspect the flame retardant of formula (I) may include;

$C_{12}H_2Br_8O$, tetrabromobisphenol A, bis(2-hydroxyethyl ether) of tetrabromobisphenol A, and octabromobisphenyl oxide The preferred compound is decabromodiphenyl oxide.

Toxicity information suggests that it has a very low order of acute toxicity, whether by ingestion, inhalation, or skin absorption.

Suitable other polymers useful pursuant to the present invention include the polylefins, such as polymers of the monomers, ethylene, propylene, butene, pentene, hexene, heptene, octene, 2-methylpropene-1, 3-methylbutene-1, 4-methylpentene-1, 4-methylhexene-1, 5-methylhexene-1, bicyclo-(2,2,1)-2-heptene, butadiene, pentadiene, hexadiene, isprene, 2,3-dimethylbutadiene-1,3, 1-methylpentadiene-1, 3,4-vinylcyclohexene, vinylcyclohexene, cyclopetadiene, styrene and methylstyrene, and the like.

The polymers of the invention can be in various physical forms, such as shaped articles, for example, moldings, sheets, rods, and the like; fibers, coatings, films and fabrics and the like. Most preferred is wherein the polyolefin is polypropylene shaped as a fiber into fabric.

The flame retardant compound of formula I typically contains about 83% to 85% bromine, e.g., 83.3% Br in the product. Surprisingly, it has been found that the polyolefin still remains white, and does not become brown or grey, especially when dyed, while a high level of fire and flame retardancy is achieved.

What is claimed is:

1. An extruded polyolefin fiber comprising a polyolefin, a compound having the following formula:

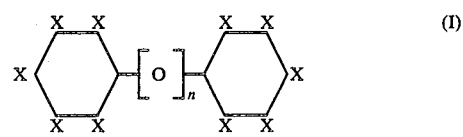

wherein n is 0 or 1; X is bromine, hydrogen, hydroxyl, or alkyl; and wherein the alkyl portion of these groups may contain hydroxyl and/or oxygen; and wherein the alkyl is a lower alkyl ($C_1$–$C_4$), and wherein there is at least one bromine for each phenyl radical, and a -3,5-alkylsubstituted(hydroxybenzyl)isocyanurate, wherein said fiber is flame retardant and substantially water white.

2. The fiber of claim 1, wherein the polyolefin is polypropylene and compound (I) is decabromodiphenyl oxide and the isocyanurate is tris(3,5-di-t-butyl-4-hydroxybenzyl)isocyanurate.

3. The fiber of claim 1, wherein the weight of compound (I) in polyolefin is about 3 to about 15 percent by weight.

4. The flame retardant of claim 1, wherein X is bromine.

5. The fiber of claim 1, wherein there are a plurality of fibers formed as a fabric.

6. The material of claim 5, wherein said fabric is dyed but no grey tone imparted to the dyed fabric.

7. An extruded polypropylene fiber comprising polypropylene, a bromodiphenyl oxide and an -3,5-alkyl substituted(hydroxybenzyl)isocyanurate, wherein said fiber is substantially water white.

8. The fiber of claim 7, wherein the bromodiphenyl oxide is decabromodiphenyl oxide.

9. The fiber of claim 8, wherein the isocyanurate is tris(3,5-di-t-butyl-4-hydroxybenzyl)isocyanurate.

10. The fiber of claim 9, wherein there are a plurality of fibers formed as a fabric.

11. The fiber of claim 10, wherein said fabric is dyed but no grey tone imparted to the dyed fabric.

* * * * *

UNITED STATES PATENT AND TRADEMARK OFFICE
CERTIFICATE OF CORRECTION

PATENT NO. : 4,532,278
DATED : July 30, 1985
INVENTOR(S) : Henry Hancock

It is certified that error appears in the above-identified patent and that said Letters Patent is hereby corrected as shown below:

Column 4, lines 6 and 7 are eliminated.

Signed and Sealed this

Twenty-fifth Day of March 1986

[SEAL]

Attest:

DONALD J. QUIGG

Attesting Officer

Commissioner of Patents and Trademarks